Figure 1:
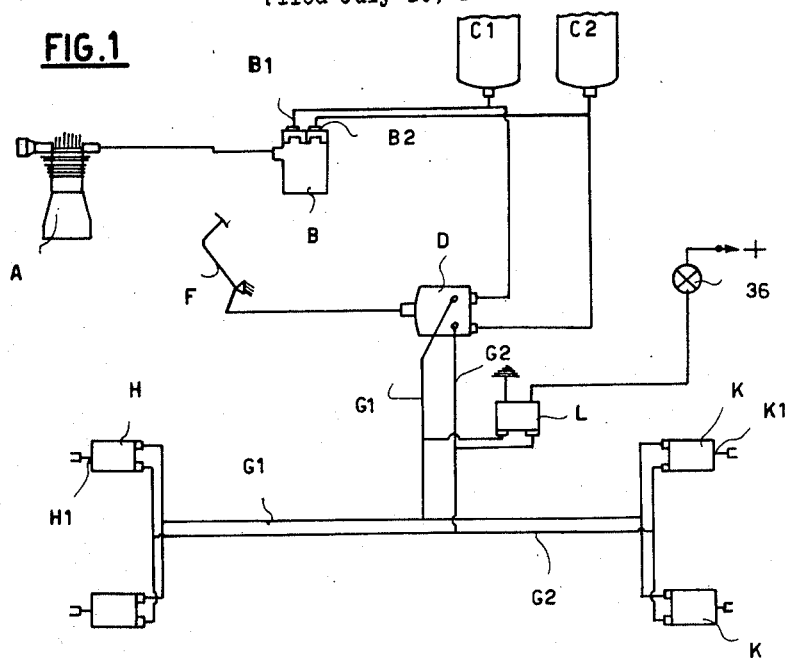

July 12, 1966 G. ALFIERI 3,260,551
DUAL SERVICE BRAKE SYSTEM WITH FAILURE INDICATOR
Filed July 16, 1962

INVENTOR.
Giuseppe Alfieri
BY
Carl C. Batz
Atty.

ated July 12, 1966

3,260,551
DUAL SERVICE BRAKE SYSTEM WITH FAILURE INDICATOR

Giuseppe Alfieri, Milan, Italy, assignor to Fabbrica Italiana Magneti Marelli S.p.A., Milan, Italy, a corporation of Italy
Filed July 16, 1962, Ser. No. 209,830
Claims priority, application Italy, July 19, 1961, 13,282/61
3 Claims. (Cl. 303—1)

Present invention refers to a pneumatic brake plant for vehicles in general, which has a plurality of independent braking sections with constant efficiency.

Pneumatic brake plants for heavy motor cars are well known in the art, said motor cars providing means to actuate the pneumatic brake plants for the purpose of achieving the whole efficiency in one or more of the remaining braking sections in the case of failure or breakage in one of these braking sections.

The exclusion of the damaged braking section is carried out downstream the compressor or pressure regulator by as many check valves as there are plant braking sections. Each of these braking sections feeds an associated compressed air tank and the compressed air distributor of any section feeds the compressed air of said tanks to the braking members.

The compressed air distributors are in general collected in a single unit providing a single control connected to the foot brake pedal.

The safe running of the vehicle is ensured because, if a possible failure in one of the braking sections takes place, then the remaining braking sections maintain their efficiency in such a way that a safe slowing down or stop of the vehicle is always possible, however, by taking into due account the greater space and time required owing to the whole missing braking action on the wheels of the brake members under the control of the damaged braking section.

In general the degree of safety achieved by means of the pneumatic brake plants above referred to is great enough to prevent serious damages in the case of failure or breakage in the pneumatic brake plants. There are, however, in particular cases, as in the pneumatic brake plants of urban or interurban buses particularly when running along very steep roads, where the safety degree of these pneumatic brake plants is insufficient to avoid dangerous situations, which can cause disastrous consequences.

The present invention relates to a pneumatic brake plant with a plurality of independent braking sections and which operates with the maximum degree of safety and the maximum and whole efficiency in the case of failure in one of the plant braking sections.

The pneumatic brake plant according to the invention of the kind with a source of compressed air, a pressure regulator and sectioning valves, is characterized in that it has a compressed air distributor with two or more sections, each of which feeds all of the operating members acting upon the vehicle brakes.

According to the invention, at least a part of the operating members for the pneumatic plant brakes includes two power members or units with double feeding both acting upon an associated brake member. This pneumatic brake plant is completed by a signalling device indicating to the driver that a failure is occurring in this pneumatic brake plant.

The provision of such a signalling device enables the driver to realise immediately the failure even though the vehicle brake efficiency remains unaltered and he can intervene soon after to eliminate the failure. Moreover, the signalling device operates also if a sensible compressed air loss or leakage occurs in one of the plant braking sections because of a failure for any reason.

In another embodiment of the pneumatic brake plant applied particularly and advantageously to trucks or tractors for semitrailers (wherein the load on the rear axle is by loaded vehicle much greater than the load on the front axle) the operative members for the front wheel brakes are of the conventional kind, whereas the operative members for the rear wheel brakes include double elements. One of the plant braking sections feeds the operative members for the front brakes and a part of the double elements for the rear brakes, whereas the other braking section feeds the other part of the operative double elements for the rear brakes and the eventual semitrailer.

In such a case, if a failure or breakage occurs in the first braking section, then the vehicle brake efficiency is slightly reduced as the braking action of the front brakes fails. On the contrary in the case of breakage in the second braking section the braking efficiency remains unaltered and the failure in either braking section is signalled to the driver by the signalling device.

In an advantageous embodiment of such a device, there are two cylinder piston units each extending to either of both braking sections of the pneumatic brake plant and the movable parts of such cylinder-piston units are connected to the ends of a rocker lever to control feeding to optical and/or acoustic signalling devices, when some pressure unbalance is occurring in the compressed air feeding the braking sections under consideration.

The invention is illustrated by way of example only in the accompanying drawing which, taken along with the following description, sets forth some preferred embodiments of the pneumatic brake plant. In the drawing, FIG. 1 is a diagram of a pneumatic brake plant for a vehicle with two axles.

Figure 2:
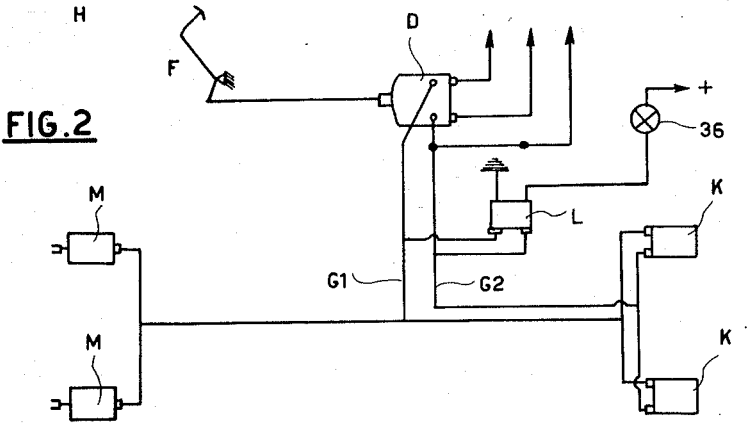
Figure 3:
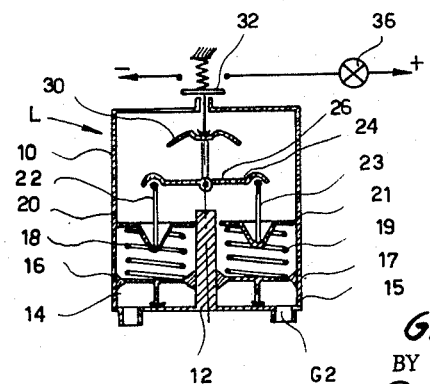

FIG. 2 is a like diagram of a pneumatic brake plant for a truck or tractor with semitrailer and FIG. 3 is a diagrammatic section of a preferred embodiment of an electric signalling device.

With reference to FIG. 1, the pneumatic brake plant has a pressure generator A, whose output is connected to a separator-regulator B having check valves $B_1$ and $B_2$, and from said check valves the braking sections extending to the single brake members. Specifically, the pipes from the check vales $B_1$ and $B_2$ are in communication with associated compressed air tanks $C_1$ and $C_2$ and both terminate at a compressed air distributor D under the control of the foot pedal F through suitable linkages.

Two pipes $G_1$ and $G_2$ feed from distributor D the pairs of operating members H–K, the first serving to control the front wheel brakes and the second the rear wheel brakes. Each one of said operative members includes a cylinder, wherein slide two pistons or two membranes controlling through a single rod $H_1$–$K_1$ the brake members and this as specified and illustrated in other patent specifications of the same applicant.

The pipes $G_1$ and $G_2$ are also connected to a signalling device whose section is shown in FIG. 3. This device includes a casing 10 divided through a partition 12 in two parallel cylindrical chambers 14 and 15, which are pneumatically connected to pipes $G_1$ and $G_2$. In cylinders 14 and 15 there are provided pistons 16 and 17 sliding against springs 18, 19 retained by caps 20 and 21. These caps are connected through connecting rods 22 and 23 to the ends of a rocker lever 24, hinged by means of a pivot pin 26 to the casing 10.

The rocker lever 24 has in its middle part an arm, to which is secured a cam 30, which outline is symmetric with relation to its middle part.

The movable part of an electric switch 32 co-operates with cam 30 and controls a signalling member 36, which may include a lamp and that is actuated, when either of both braking sections fails.

When the pneumatic brake plant is its normal operative condition, the compressed air is fed into both pipes $G_1$ and $G_2$ when acting upon distributor D and all of the operative members are actuated simultaneously in the known way. The signalling device L is not acted upon, as like pressures are created in both chambers 14 and 15 and therefore their action on pistons 16 and 17 and through rocker lever 24 are balanced or neutralised. The switch 32 remains therefore inoperative.

In the case that any of pipes $G_1$ or $G_2$ is cut off for any reason only one of the braking sections is fed by operation of distributor D. The brake operating members H–K are however actuated with a like force owing to their construction features and in this case two different pressures are established in the signalling device L, said pressures causing an oscillating motion of rocker lever 24 about its pivot pin 26. The cam 30 fixed to said rocker lever is therefore moved and closes switch 32 actuating the signalling device 36, which indicates to the driver the occurred failure. After elimination of this failure, the pneumatic brake plant and signalling device L return in their rest position.

In the embodiment according to FIG. 2, where the parts like that of the pneumatic brake plant shown in FIG. 1 are indicated by the same reference numerals, the compressed air distributor D controls feeding to two pipes $G_1$ and $G_2$. The first one of these pipes feeds a pair of operating members M of simple kind and acting upon the front wheel brakes of the vehicle as well as a part of a pair of operative double elements K of the kind above referred to.

The pipe $G_2$ feeds on the contrary the other part of these operating double elements.

The operation of this pneumatic brake plant is like the preceding one with the only exception that if a failure occurs in the pipe $G_1$ then the members M remain excluded and inoperative whereas the double elements K are actuated in the usual way. Also in this pneumatic brake plant the signalling device L is operated to signal the failure occurring in either pipe $G_1$ or $G_2$.

The pneumatic brake plant as well as the signalling device L as above mentioned can underly modifications and changes depending on the application and use features, without departing from the spirit of the invention and the scope of the appended claims.

What is claimed is:

1. In a pneumatic brake plant for vehicles, a distributor adapted to be connected with a source of air pressure, a braking member operative to apply braking action at a wheel of a vehicle, two air lines leading from said distributor to said member, said braking member being operable through actuation by air pressure within either of said lines, means operable by the operator of the vehicle for actuating said distributor to connect said lines to said source, a pair of air cylinders one of which is connected to one of said lines and the other of which is connected to the other of said lines, a centrally pivoted rocker element, a piston in one of said cylinders connected to one end of said element, a piston in the other of said cylinders connected to the other end of said element, said rocker element having a cam attached thereto, an electrical circuit having a lamp and a switch therein, said switch including a spring-pressed contact riding on said cam, said contact being normally in position to maintain said circuit in open condition but being movable in response to the movement of said cam from its normal position in either direction about said pivot to close said circuit and light said lamp.

2. A device as set forth in claim 1 wherein said rocker element includes an arm extending upwardly and radially of said pivot, said cam being carried by the end of said arm.

3. A device as set forth in claim 1 wherein said cam has a central depression which is adapted to receive said contact when the device is balanced and the air pressure within said lines is substantially the same but which in a condition of substantial unbalance of said pressures will permit movement of said contact along said cam to a point where it is operative to close said circuit and light said lamp.

References Cited by the Examiner

UNITED STATES PATENTS

| | | | |
|---|---|---|---|
| 908,205 | 12/1908 | Craig | 73—407 |
| 1,007,178 | 10/1911 | Billings | 200—81.5 X |
| 2,694,191 | 11/1954 | Falanga et al. | 188—152 X |
| 2,921,440 | 1/1960 | Feibush | 303—84 X |
| 2,979,365 | 4/1961 | Jones | 303—84 |
| 3,067,842 | 12/1962 | Smith | 188—204 |

FOREIGN PATENTS

| | | |
|---|---|---|
| 832,151 | 6/1938 | France. |
| 562,444 | 5/1957 | Italy. |

EUGENE G. BOTZ, *Primary Examiner.*